(12) United States Patent
Nagata et al.

(10) Patent No.: US 9,985,568 B2
(45) Date of Patent: May 29, 2018

(54) MOTOR CONTROL APPARATUS

(71) Applicant: DENSO CORPORATION, Kariya, Aichi-pref. (JP)

(72) Inventors: Hiromitsu Nagata, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/284,978

(22) Filed: Oct. 4, 2016

(65) Prior Publication Data
US 2017/0104435 A1    Apr. 13, 2017

(30) Foreign Application Priority Data

Oct. 12, 2015   (JP) .................. 2015-201670

(51) Int. Cl.
| | |
|---|---|
| H02P 1/04 | (2006.01) |
| H02P 29/024 | (2016.01) |
| F16H 61/12 | (2010.01) |
| F16H 61/32 | (2006.01) |
| G05B 23/02 | (2006.01) |
| H02P 6/14 | (2016.01) |

(52) U.S. Cl.
CPC .......... *H02P 29/024* (2013.01); *F16H 61/12* (2013.01); *F16H 61/32* (2013.01); *G05B 23/0275* (2013.01); *H02P 6/14* (2013.01); *H02P 29/0241* (2016.02); *F16H 2061/1268* (2013.01); *F16H 2061/1284* (2013.01); *F16H 2061/326* (2013.01)

(58) Field of Classification Search
CPC .... A61M 2005/16863; A61M 5/16831; A61M 220/332; A61M 2205/333
See application file for complete search history.

(56) References Cited

U.S. PATENT DOCUMENTS

| | | | |
|---|---|---|---|
| 8,884,571 B2* | 11/2014 | Okita ................ | G05B 9/02 318/566 |
| 2004/0008002 A1 | 1/2004 | Kamio et al. | |
| 2006/0108966 A1 | 5/2006 | Kamio et al. | |
| 2006/0181235 A1* | 8/2006 | Imaie ................ | H02P 3/22 318/375 |
| 2009/0292431 A1* | 11/2009 | Hoshino ........... | F16H 61/12 701/62 |
| 2011/0221377 A1* | 9/2011 | Ueno ............... | G05B 19/4062 318/565 |

(Continued)

*Primary Examiner* — Shawki S Ismail
*Assistant Examiner* — Zoheb Imtiaz
(74) *Attorney, Agent, or Firm* — Nixon & Vanderhye PC

(57) ABSTRACT

An integrated IC provided in an SBW-ECU has plural functions such as a receiving function of receiving output signals of an encoder and a current supply function of supplying current to each phase of the motor. A microcomputer checks individually whether the signal receiving function and the current supply function are potentially abnormal and checks whether the integrated IC is abnormal based on the check results about the signal receiving function and the current supply function. For example, when it is determined that only the signal receiving function of the integrated IC is potentially abnormal, the encoder is determined to be abnormal. When it is determined that the signal receiving function and the current supply function of the integrated IC are both potentially abnormal, the integrated IC is determined to be abnormal.

8 Claims, 5 Drawing Sheets

(56) References Cited

U.S. PATENT DOCUMENTS

2012/0185149 A1* 7/2012 Asou .................... F02D 41/221
                                                            701/102
2013/0241570 A1* 9/2013 Okamoto ........... G01R 31/2841
                                                            324/537
2014/0035560 A1* 2/2014 Olmos ............. G01R 31/31719
                                                            324/76.41

* cited by examiner

MOTOR CONTROL APPARATUS

CROSS REFERENCE TO RELATED APPLICATION

This application is based on Japanese patent application No. 2015-201670 filed on Oct. 12, 2015, the whole contents of which are incorporated herein by reference.

FIELD

The present disclosure relates to a motor control apparatus, which rotationally drives a motor by switching over current supply phases of the motor based on a count value of output signals of an encoder.

BACKGROUND

It is a recent tendency to change a mechanical driving system to an electrical driving system, which uses a motor, for meeting requirements to save space, simplify assembling work and enhance controllability in a vehicle. As disclosed in JP 2004-56856A (US 2004/0008002A1 and US 2006/0108966A1), for example, a shift range switchover mechanism of an automatic transmission of a vehicle is driven by a motor. This apparatus uses an encoder, which outputs output signals at each rotation of a predetermined angular interval in synchronization with rotation of the motor, and rotationally drives the motor by sequentially switching over current supply phases of the motor based on a count value of the output signals of the encoder.

It is under development to uses in a control circuit an integrated IC, which includes plural functions such as receiving of the output signals of the encoder and supplying currents to phases of the motor.

When a power source voltage falls to be lower than an operation guarantee voltage of the integrated IC, the integrated IC is disabled to perform its function of receiving the output signals of the encoder and update a count value of the output signals of the encoder. For this reason, it is necessary to detect abnormality of the integrated IC. If the abnormality of the signal receiving function of the integrated IC is not detected, the encoder is likely to be detected as being abnormal and the encoder or an encoder-integrated motor, which is still normal, is likely to be replaced with new one erroneously.

It is therefore an object of the present disclosure to provide a motor control apparatus, which detects abnormality of an integrated IC mounted in a system for rotationally driving a motor by switching over current supply phases based on a count value of output signals of an encoder.

According to one aspect, a motor control apparatus comprises a motor provided as a drive power source for a control object, an encoder for outputting output signals in synchronization with rotation of the motor, a control part for rotationally driving the motor by sequentially switching over a current supply phase of the motor based on a count value of the output signals of the encoder, an integrated IC having plural functions, which include at least one of a receiving function for receiving output signals of the encoder and a power supply function for supplying a current to each phase of the motor, and an abnormality diagnosis part for checking individually whether an abnormality is present potentially with respect to at least two functions among the plural functions of the integrated IC and checking whether the integrated IC is abnormal based on check results about the at least two functions.

DETAILED DESCRIPTION OF EMBODIMENT

A motor control apparatus will be described with reference to several embodiments.

First Embodiment

Figure 1:
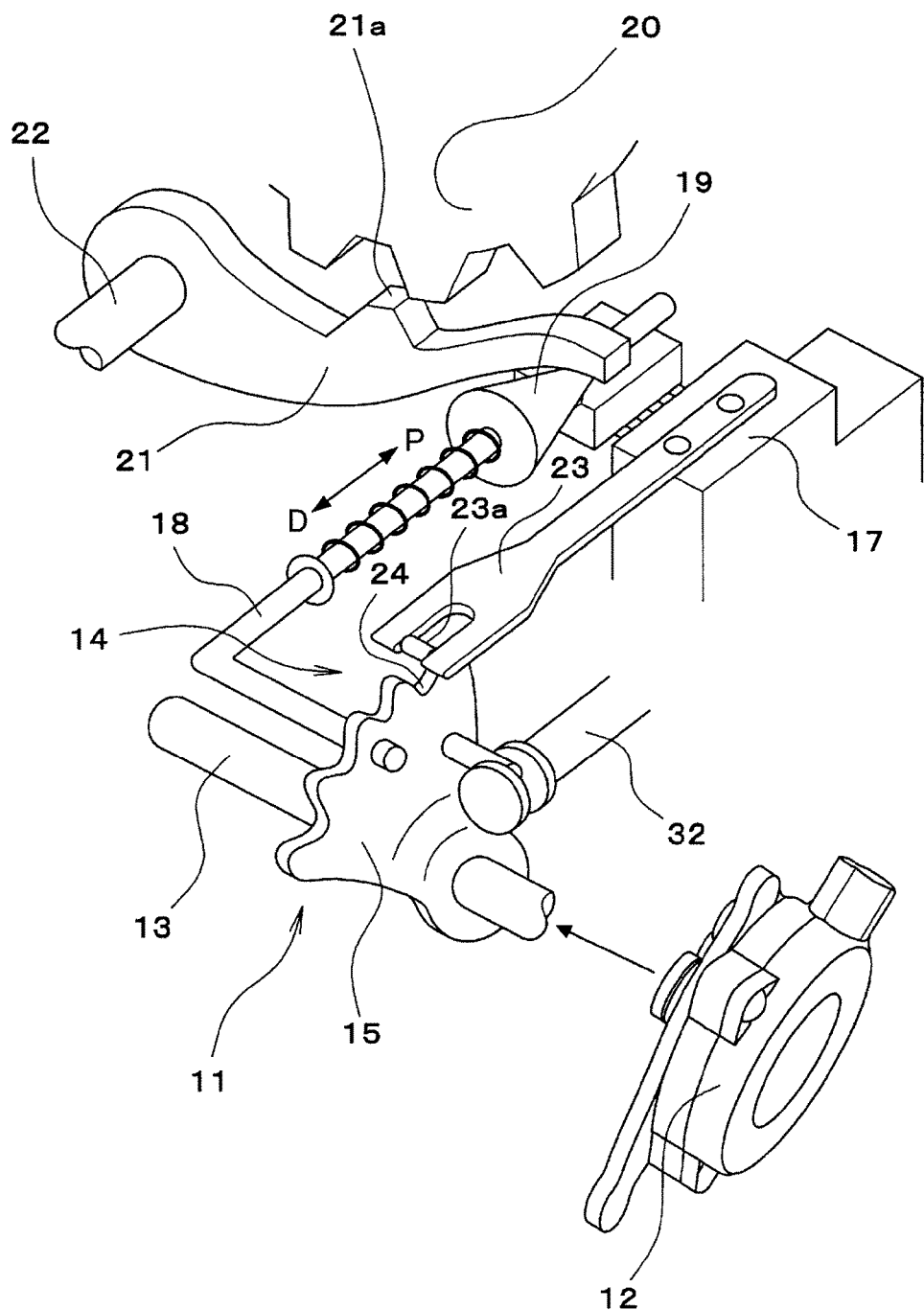
FIG. 1 is a perspective view of a range switchover mechanism according to a first embodiment of a motor control apparatus.
Figure 2:
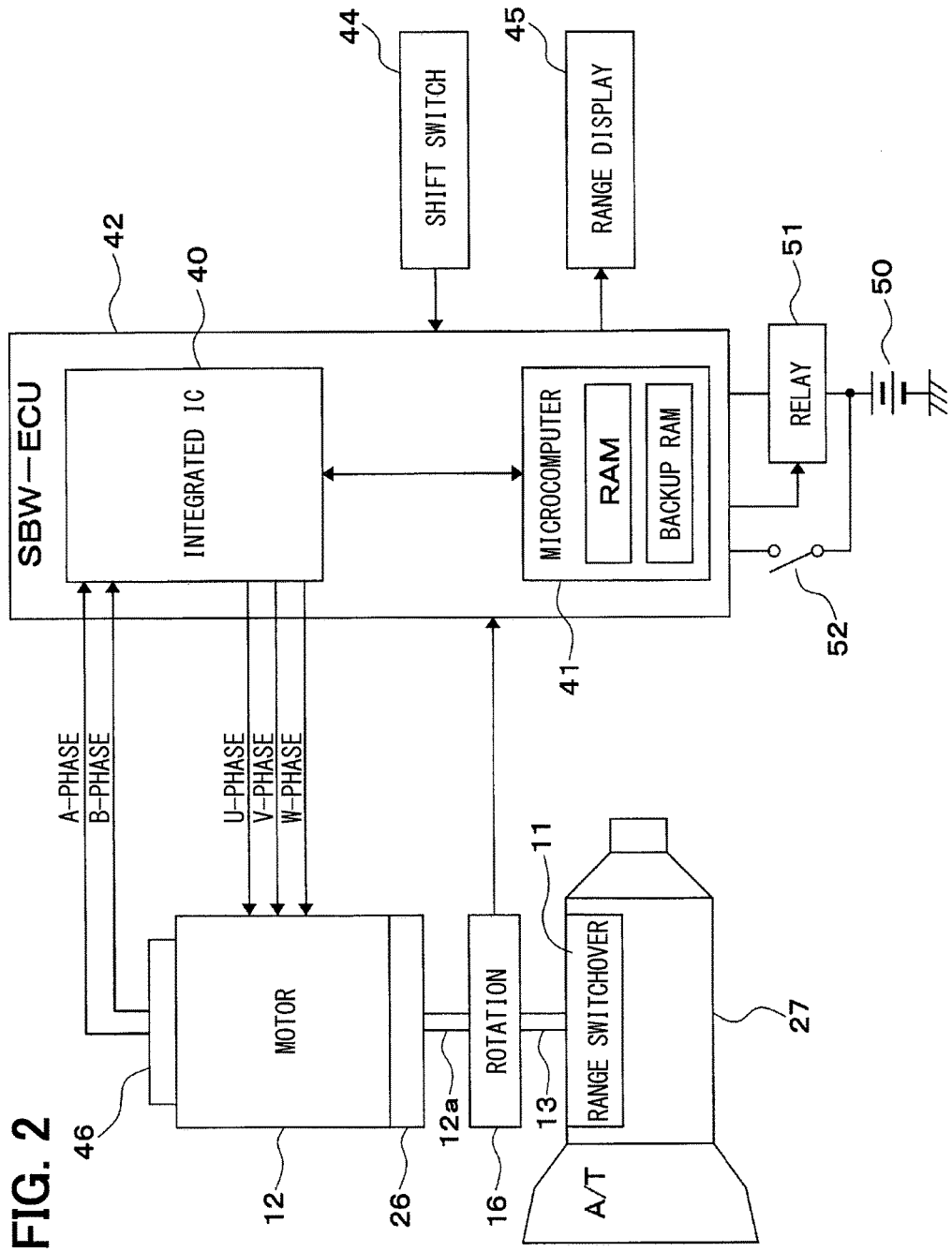
FIG. 2 is a block diagram of a range switchover control system.

A first embodiment of a motor control apparatus will be described with reference to FIG. 1 to FIG. 3, in which FIG. 1 and FIG. 2 show configuration of a range switchover control system, to which a motor control apparatus is applied. As shown in FIG. 1 and FIG. 2, a range switchover mechanism 11 is a four-position type, which switches over shift ranges of an automatic transmission (A/T) 27 mounted in a vehicle among P-range, R-range, N-range and D-range. The P-range indicates a parking range. The R-range indicates a reverse range. The N-range indicates a neutral range. The D-range indicates a drive range. A motor 12 is provided as a drive power source for the range switchover mechanism 11 and formed of, for example, a switched reluctance motor. The motor 12 includes a reduction mechanism 26. An output shaft 12a of the motor 12 is linked to a manual shaft 13 of the range switchover mechanism 11.

As shown in FIG. 1, a detent lever 15 is fixed to the manual shaft 13. A manual valve 32, which moves linearly in correspondence to rotation of the detent lever 15, is linked to the detent lever 15. The shift range of the automatic transmission 27 is switched over by switching over internal hydraulic circuit (not shown) of the automatic transmission 27 by the manual valve 32.

An L-shaped parking rod 18 is fixed to the detent lever 15. A conical body 19 provided at a top end part of the parking rod 18 abuts a lock lever 21. The lock lever 21 is movable upward and downward about an axis 22 in accordance with a position of the conical body 19 to thereby lock and unlock a parking gear 20. The parking gear 20 is provided on an output shaft of the automatic transmission 27. When the parking gear 20 is locked by the lock lever 21, driving wheels of a vehicle are maintained in a rotation-prevented state, that is, parking state.

A detent spring 23 is fixed to a support base 17 thereby to hold the detent lever 15 in each of P-range, R-range, N-range and D-range. The detent lever 15 is formed with four range holding recesses 24 for P-range, R-range, N-range and D-range. When an engagement part 23a provided at a top end of the detent spring 23 falls in the range holding recess part 24 of the detent lever 15, the detent lever 15 is held in the position of each range. The detent lever 15, the detent spring 23 and the like form a mechanism 14, which engages and holds the rotation position of the detent lever 15 in each range position, that is, holds the range switchover mechanism 11 in each range position.

In the P-range, the L-shaped parking rod 18 moves in a direction to approach to the lock lever 21 and the large diameter part of the conical body 19 lifts the lock lever 21. A protrusion part 21a of the lock lever 21 fits in the parking gear 20 and locks the parking gear 20. The output shaft of the automatic transmission 27 is held in a locked-state, that is, parking state.

In the shift ranges other than the P-range, the parking rod 18 moves away from the lock lever 21 and the large diameter part of the conical body 19 is pulled out from the lock lever 21. The lock lever 21 thus moves down. Thus, the protrusion part 21a of the lock lever 21 is disengaged from the parking gear 20 and the parking gear 20 is released from the locked-state. As a result, the output shaft of the automatic transmission 27 is held in a rotatable state, that is, vehicle travel state.

As shown in FIG. 2, a rotation sensor 16 is provided for the manual shaft 13 of the range switchover mechanism 11 to detect a rotation angle, that is, rotation position, of the manual shaft 13. The rotation sensor 16 is a sensor, for example, a potentiometer, which outputs a voltage varying with the rotation angle of the manual shaft 13. It is thus possible to confirm which one of the P-range, R-range N-range and D-range the actual shift range is in based on the output voltage of the rotation sensor 16.

An encoder 46 is provided in the motor 12 to detect a rotation angle, that is, rotation position, of a rotor of the motor 12. The encoder 46 is formed of, for example, a magnetic-type rotary encoder. The encoder 46 is configured to output A-phase and B-phase pulse signals at each rotation of a predetermined angle in synchronization with the rotor rotation of the motor 12.

The output signals of the encoder 46 are supplied to a microcomputer 41 of a shift-by-wire electronic control unit (SBW-ECU) 42 through an integrated IC 40 provided in the SBW-ECU 42. The integrated IC 40 has a function of receiving the output signals of the encoder 46, which is simply referred to as a signal receiving function. The integrated IC 40 further has a function of supplying current to each phase of the motor 12, which is simply referred to as a current supply function. The integrated IC 40 further has a function of turning on and off a power supply relay 51 described later and a function of detecting a current flowing to the motor 12, for example, the current flowing to a common connection node of phase coils of the motor 12.

The microcomputer 41 of the SBW-ECU 42 counts both of rising edge and falling edge of each of the A-phase signal and the B-phase signal outputted from the encoder 46. The microcomputer 41 drives the motor 12 to rotate by switching over the current supply phases of the motor 12 in a predetermined sequence by the integrated IC 40 in accordance with its count value, that is, encoder count value. The motor 12 may be configured to include dual systems of coils of three phases (U-phase, V-phase and W-phase) of the motor 12 so that the motor 12 continues to rotate with only one of the dual systems even when the other of the dual systems fails.

The microcomputer 41 determines a direction of rotation of the motor 12 based on a sequence of generation of the A-phase signal and the B-phase signal during rotation of the motor 12. In the normal rotation, for example, rotation direction from the P-range to the D-range, the encoder count value is counted up. In the reverse rotation, for example, rotation direction from the D-range to the P-range, the encoder count value is counted down. Thus, whichever direction the motor 12 rotates between the normal rotation direction and the reverse rotation direction, the correspondence between the encoder count value and the rotation angle of the motor 12 is maintained. It is thus possible to detect the rotation position of the motor 12 based on the encoder count value whichever direction the motor 12 rotates between the normal rotation direction and the reverse rotation direction and rotationally drives the motor 12 with current supply to phase coils corresponding to the rotation position.

A shift-lever operation position signal detected by a shift switch 44 is supplied to the SBW-ECU 42. The microcomputer 41 of the SBW-ECU 42 switches over a target range, that is, a target shift range, in accordance with a shift lever operation of a driver and switches over the shift range by rotationally driving the motor 12 in correspondence to the target range. The microcomputer 41 further displays the actual switched-over shift range on a range display part 45 in an instrument panel (not shown) in the vehicle.

A power source voltage is supplied to the SBW-ECU 42 from a battery 50 (power source), which is mounted in the vehicle, through a power supply relay 51. The integrated IC 40 switches over the power supply relay 51 to turn on and off when an ignition switch (IG switch) 52, which is a power source switch, is manually operated to turn on and off. When the IG switch 52 is turned on, the power supply relay 51 is turned on to supply the power source voltage to the SBW-ECU 42. When the IG switch 52 is turned off, the power supply relay 51 is turned off to shut down power supply to the SBW-ECU 42.

The encoder count value is stored in a RAM of the microcomputer 41. The stored value of the encoder count value is lost, when the power source for the SBW-ECU 42 is shut down. As a result, the encoder count value, which is present in the RAM immediately after the power supply to the SBW-ECU 42, does not correspond to the actual rotation position and the current supply phase of the motor 12. It is therefore necessary, for switching over the current supply phase in correspondence to the encoder count value, to make the encoder count value and the actual rotation position of the motor 12 match each other and make the encoder count value and the current supply phase after the power supply.

For this reason, the microcomputer 41 performs initial driving after the power supply to learn an actual correspondence between the current supply phase of the motor 12 and the encoder count value. In the initial driving, the microcomputer 41 switches over the current supply phase of the motor cyclically in a predetermined time schedule in an open loop so that the motor 12 is driven to rotate with its rotation position and the current supply phase being matched at either one of the current supply phases. The microcomputer 41 thus counts the edges of the A-phase signal and the B-phase signal of the encoder 46. The microcomputer 41 thus learns the correspondence among the encoder count value, the rotation position and the current supply phase of the motor 12 at the time of ending the initial driving.

The microcomputer 41 can detect only a rotation angular interval, that is, rotation angle, from a start position of the motor 12 based on the encoder count value, which is after activation of the motor 12. For this reason it is not possible to rotationally drive the motor 12 to the target rotation position accurately unless an absolute rotation position of the motor 12 is detected after the power supply is started.

The microcomputer 41 therefore performs butting control, which rotates the motor 12 until the motor 12 buts against a limit position of a movable range of the switchover mechanism 11, after finishing the initial driving, and learns the limit position as a reference position. The microcomputer 41 controls the rotation angular interval, that is, rotation angle, of the motor 12 relative to the encoder count value indicative of the reference position.

More specifically, the microcomputer 41 learns a limit position of a P-range side as a reference position of a P-range side by performing "P-range wall butting control," in which the motor 12 is rotated until the engagement part 23a of the detent spring 23 butts a P-range wall, that is, a side wall of a P-range holding recess part 24, which is a limit position of the P-range side in a movable range of the switchover mechanism 11. Alternatively, the microcomputer 41 may learn a limit position of a D-range side as a reference position of a D-range side by performing "D-range wall butting control," in which the motor 12 is rotated until the engagement part 23a of the detent spring 23 butts a D-range wall, that is, a side wall of a D-range holding recess part 25, which is a limit position of the D-range side in the movable range of the switchover mechanism 11.

After learning the reference position, the microcomputer 41 changes the target rotation position, that is, target count value, in correspondence to a switchover of the target range by, for example, manual operation of a driver on the shift lever. The microcomputer 41 then performs feedback control, in which the motor 12 is rotationally driven to the target rotation position, which corresponds to the target shift range, by sequentially switching over the current supply phase of the motor 12 based on the encoder count value. Thus the microcomputer 41 switches over the shift range to the target range, that is, switches over the switchover position of the range switchover mechanism 11 to the position of the target range. The microcomputer 41 thus operates as a control part.

When the power supply voltage falls below the guarantee voltage of the integrated IC 40 in the midst of rotation of the motor 12, that is, during feedback control, the signal receiving function of the integrated IC 40 does not operate normally and the encoder count value is not updated normally. If it is not possible to detect the abnormality of the integrated IC 40, the encoder 46 is likely to be erroneously determined to be abnormal although it is actually the abnormality of the signal receiving function of the encoder 46. As a result, the encoder 46 or the motor 12 integrated with the encoder 46, which is not abnormal, is replaced erroneously with new one.

Figure 3:
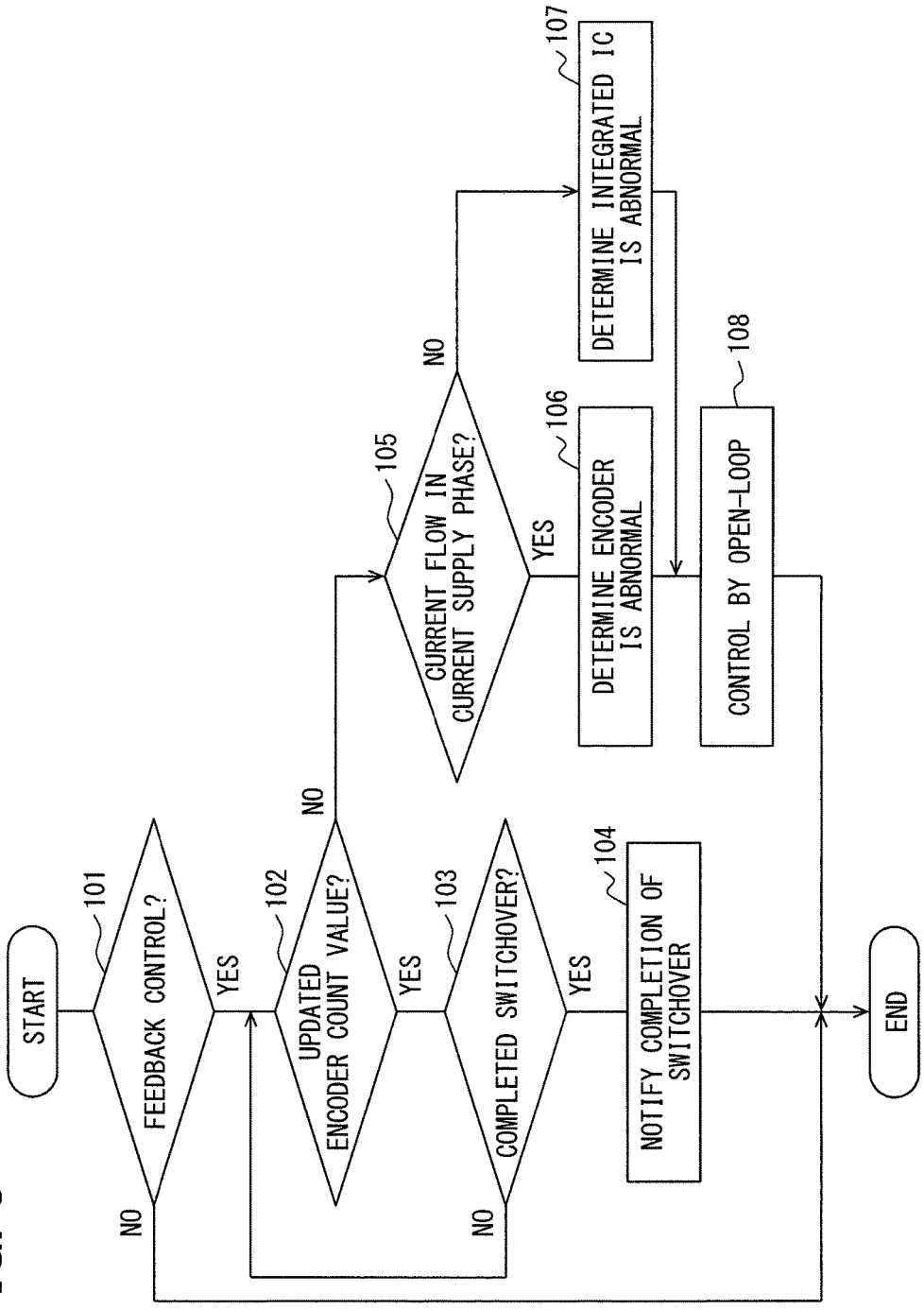
FIG. 3 is a flowchart showing processing of an abnormality diagnosis routine executed in the first embodiment.

In the first embodiment, the microcomputer 41 of the SBW-ECU 42 is configured to perform the following abnormality diagnosis by execution of an abnormality diagnosis routine shown in FIG. 3. The microcomputer 41 checks whether there is potential abnormality in each of two functions of the integrated IC 40, that is, receiving function and power supply function and checks whether the integrated IC 40 is abnormal based on such check results.

When the integrated IC 40 is abnormal, it is highly likely that each function of the integrated IC 40 does not operate normally. When only one of the functions of the integrated IC 40, for example, only the signal receiving function, is determined to be potentially abnormal, it is highly likely that a component part, for example, the encoder 46 related to such a function, is highly likely to be abnormal but it is less likely that the integrated IC 40 is abnormal. When both of the two functions of the integrated IC 40, for example, both the signal receiving function and the current supply function, are determined to be potentially abnormal, it is less likely that each of component parts, for example, the encoder 46 and a coil of the motor 12 related to such functions is abnormal at the same time but it is highly likely that the integrated IC 40 is abnormal. It is thus possible to detect abnormality of the integrated IC 40 accurately by checking whether the abnormality is potentially present with respect to each of the two functions of the integrated IC 40 and checking whether the integrated IC 40 is abnormal based on the check results about such two functions.

The abnormality diagnosis routine, which is shown in FIG. 3 and executed by the microcomputer 41 of the SBW-ECU 42 in the first embodiment, will be described below. The abnormality diagnosis routine shown in FIG. 3 is repetitively executed by the microcomputer 41 at a predetermined interval while the power source voltage is supplied to the SBW-ECU 42. This abnormality diagnosis routine corresponds to an abnormality diagnosis part.

In this routine, it is first checked at step 101 whether the motor 12 is under the feedback control. In the feedback control, as described above, the motor 12 is rotationally driven to the target rotation position, which corresponds to the target shift range, by sequentially switching over the current supply phase based on the encoder count value. Thus, the shift range is switched over to the target shift range.

When it is determined at step 101 that the feedback control is under way Yes), step 102 is executed to check whether the signal receiving function of the integrated IC 40 is potentially abnormal based on whether the encoder count value is updated. When the signal receiving function of the integrated IC 40 is abnormal, it is highly likely that the encoder count value will not be updated. It is thus possible to check whether the signal receiving function of the integrated IC 40 is potentially abnormal based on whether the encoder count value is updated.

When it is determined at step 102 that the encoder count value is updated (Yes), it is determined that the signal receiving function of the integrated IC 40 is not potentially abnormal. In this case, it is checked at next step 103 whether the range switchover has been completed, that is, whether the motor 12 has rotated to the target rotation position, based on whether the encoder count value has reached the target count value.

When it is determined at step 103 that the range switchover has not been completed (No), step 102 is repeated again. When it is determined at step 103 that the range switchover has been completed (Yes), completion of the range switchover is notified at step 104, for example, a shift range switchover completion flag is set to ON.

When it is determined at step 102 that the encoder count value has not been updated (No), it is determined that the signal receiving function of the integrated IC 40 is potentially abnormal. In this case, it is checked at next step 105 whether the current supply function is potentially abnormal by checking whether a current flows to the current supply phase of the motor 12, that is, to the phase, the current supply to which is under control. The current flow to the current supply phase of the motor 12 is checked based on the output signal of the sensor, which detects each phase current or voltage, for example. When the current supply function of the integrated IC 40 is abnormal, it is highly likely that the current will not flow in the current supply phase of the motor 12. It is thus possible to check whether the current supply function of the integrated IC 40 is potentially abnormal based on whether the current flows in the current supply phase of the motor 12.

When it is determined at step 105 that the current flows in the current supply phase of the motor 12 (Yes), it is determined that the current supply function of the integrated IC 40 is not potentially abnormal. In this case, that is, when it is determined that only the signal receiving function of the integrated IC 40 out of the signal receiving function and the current supply function is potentially abnormal, step 106 is executed to determine that the encoder 46 is abnormal.

When it is determined at step 105 that the current does not flow in the current supply phase of the motor 12 (No), it is determined that the current supply function of the integrated IC 40 is abnormal. In this case, that is, when it is determined that the signal receiving function and the current supply function are both abnormal, it is determined at step 107 that the integrated IC 40 is abnormal.

After determining that the encoder 46 is abnormal at step 106 or that the integrated IC 40 is abnormal at step 107, step 108 is executed to continue the range switchover by open-loop control. In the open-loop control, the current supply phase is switched over at every predetermined time and the number of switchovers of the current supply phase is counted and the motor 12 is rotationally driven to the target rotation position, which corresponds to the target range, based on a switchover count value. An initial value of the switchover count value is set to the encoder count value provided immediately before starting the open-loop control. Alternatively the initial value may be set based on the output of the rotation sensor 16.

In the first embodiment described above, it is checked individually whether the signal receiving function and the current supply function of the integrated IC 40 are potentially abnormal in consideration that each function of the integrated IC 40 will not operate normally when the integrated IC 40 is abnormal. As a result, the integrated IC 40 is determined to be abnormal when both of the signal receiving function and the current supply function of the integrated IC 40 are potentially abnormal. It is thus possible to detect abnormality of the integrated IC 40 with high precision. It is prevented that the encoder 46 is determined to be abnormal erroneously in spite of abnormality of the integrated IC 40 and the encoder 46 or the motor 12 integrated with the encoder 46 is replaced erroneously.

Second Embodiment

A second embodiment of a motor control apparatus will be described next with reference to FIG. 4 and FIG. 5. The second embodiment will be described with respect to only differences from the first embodiment described above by designating substantially same or similar parts as in the first embodiment with same reference numerals for simplification of description.

Figure 4:
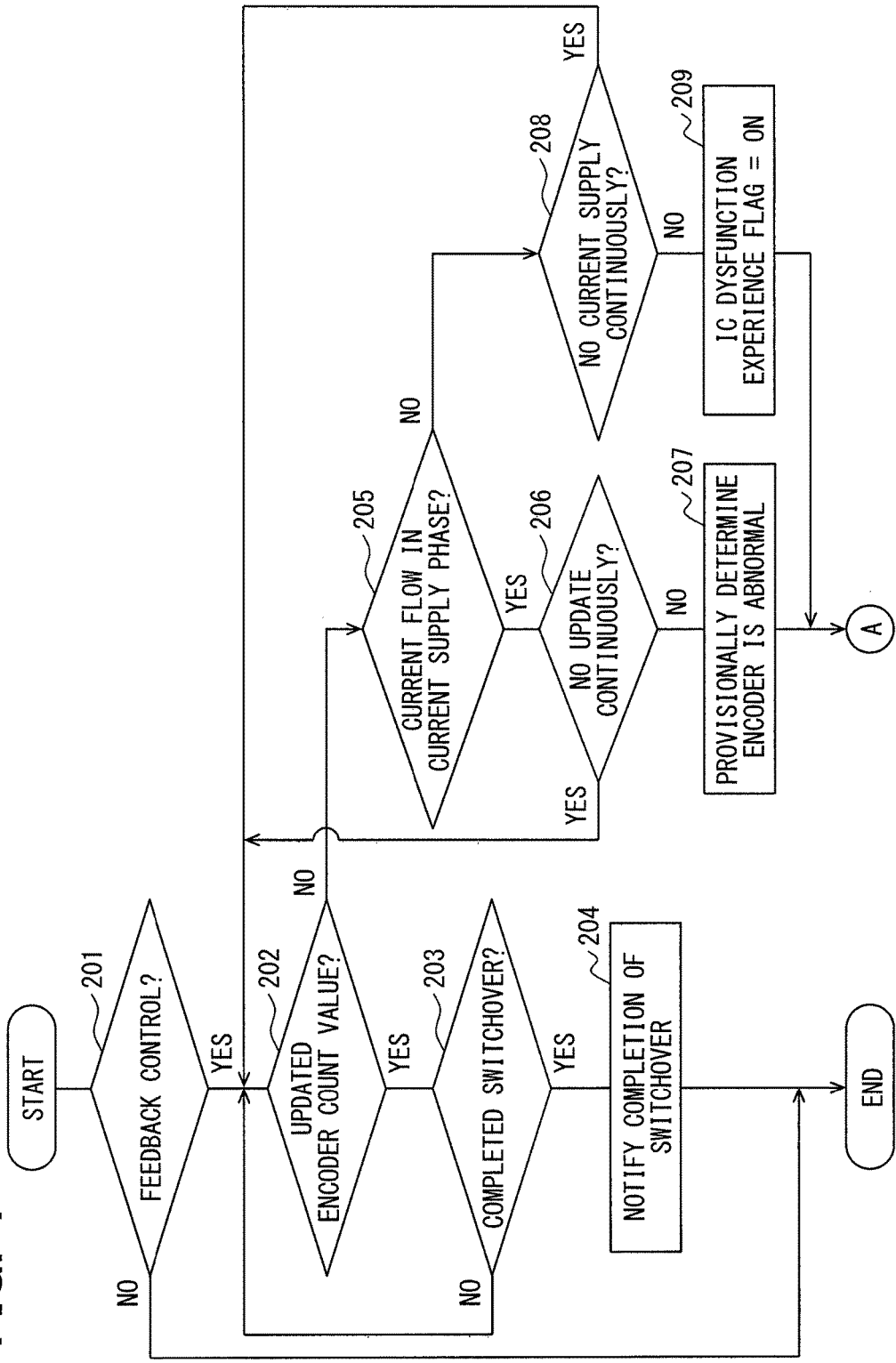
FIG. 4 is a flowchart showing processing of a first part of an abnormality diagnosis routine executed in a second embodiment of a motor control apparatus.
Figure 5:
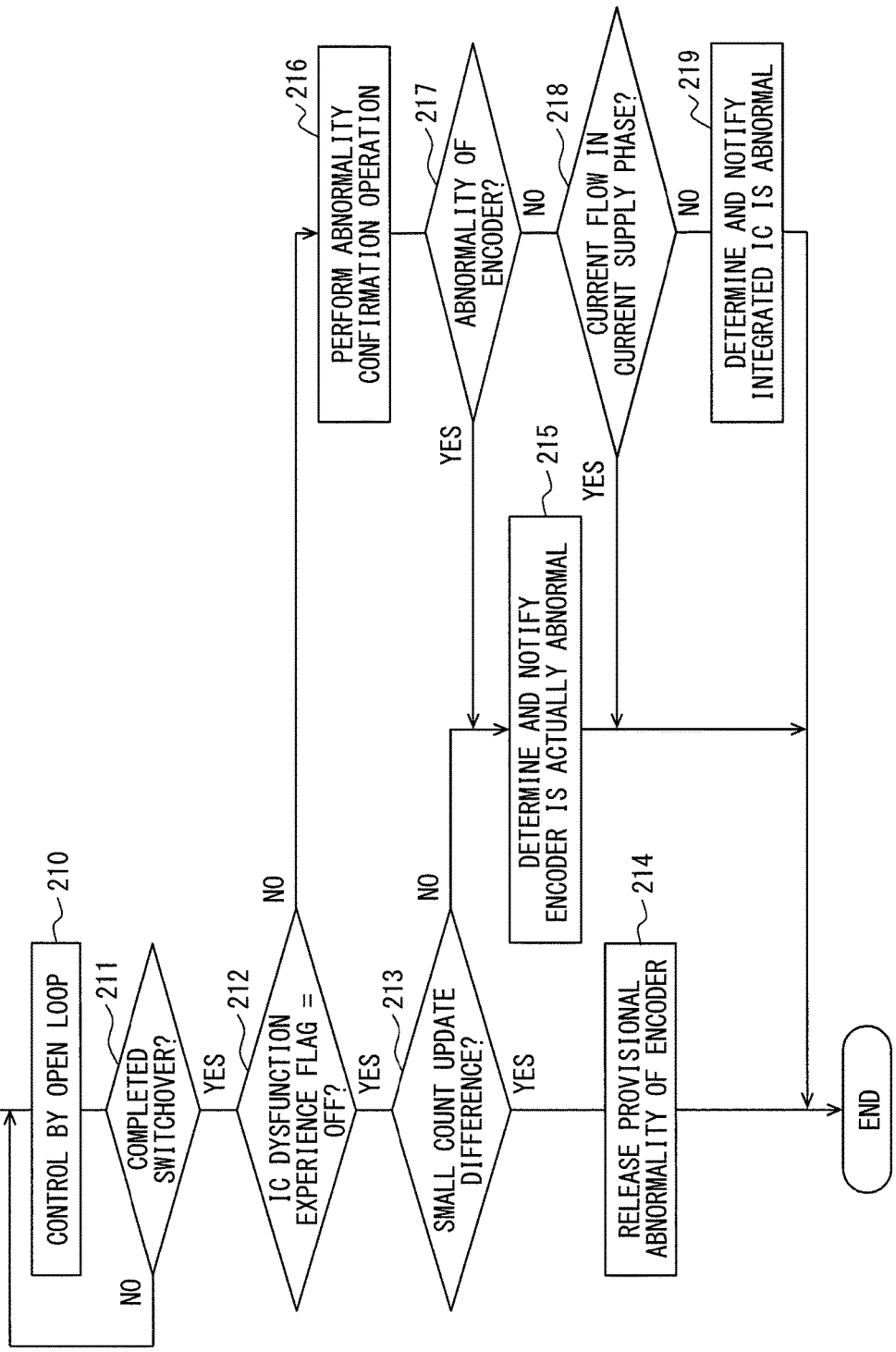
FIG. 5 is a flowchart showing processing of a second part of an abnormality diagnosis routine executed in the second embodiment.

In the second embodiment, the microcomputer 41 of the SBW-ECU 42 is configured to perform the following abnormality diagnosis by executing an abnormality diagnosis routine shown in FIG. 4 and FIG. 5. When it is determined that the signal receiving function and the power supply function of the integrated IC 40 are both potentially abnormal, it is then checked whether the encoder 46 is abnormal by performing an abnormality confirmation operation, in which the current supply phase of the motor 12 is switched over sequentially at every predetermined time. When it is determined that the encoder 46 is abnormal as a result of the abnormality confirmation operation, the encoder 46 is finally determined to be abnormal. When it is determined that the encoder 46 is not abnormal but the current does not flow in the current supply phase of the motor 12, the integrated IC 40 is finally determined to be abnormal.

The abnormality diagnosis routine, which is shown in FIG. 4 and FIG. 5 and executed by the microcomputer 41 of the SBW-ECU 42 in the second embodiment, will be described below. In the abnormality diagnosis routine shown in FIG. 4 and FIG. 5, it is checked first at step 201 whether the motor 12 is under the feedback control. When it is determined at step 201 that the feedback control is under way (Yes), step 202 is executed to check whether the signal receiving function of the integrated IC 40 is potentially abnormal based on whether the encoder count value is updated.

When it is determined at step 202 that the encoder count value is updated (Yes), it is determined that the signal receiving function of the integrated IC 40 is not potentially abnormal. In this case, it is checked at next step 203 whether the shift range switchover has been completed, that is, whether the motor 12 has rotated to the target rotation position, based on whether the encoder count value has reached the target count value.

When it is determined at step 203 that the range switchover has not been completed (No), step 202 is repeated again. Then, when it is determined at step 203 that the range switchover has been completed (Yes), completion of the shift range switchover is notified at step 204, for example, a range switchover completion flag is set to ON.

When it is determined at step 202 that the encoder count value has not been updated (No), it is determined that the signal receiving function of the integrated IC 40 is potentially abnormal. In this case, it is checked at next step 205 whether the signal receiving function is potentially abnormal based on whether a current flows in the current supply phase of the motor 12.

When it is determined at step 205 that the current flows in the current supply phase of the motor 12 (Yes), it is determined that the current supply function of the integrated IC 40 is not potentially abnormal. In this case, that is, when it is determined that only the signal receiving function of the integrated IC 40 out of the signal receiving function and the current supply function is potentially abnormal, step 206 is executed to check whether the encoder count value has not been updated for a predetermined period.

When it is determined at step 206 that the encoder count value has not been updated for more than the predetermined period, step 202 is executed again. When it is determined at step 206 that the encoder count value has not been updated continuously for more than the predetermined period (No), it is provisionally determined at step 207 that the encoder 46 is abnormal.

When it is determined at step 205 that the current does not flow in the current supply phase of the motor 12 (No), it is determined that the current supply function of the integrated IC 40 is potentially abnormal. In this case, that is, when it is determined that both of the signal receiving function and the current supply function are potentially abnormal, it is checked further at step 208 whether the current does not flow in the current supply phase of the motor 12 for a predetermined period.

When it is determined at step 208 that continuation of no current supply for the current supply phase does not reach the predetermined period (Yes), step 202 is repeated again. When it is determined at step 208 that the continuation of no current supply for the current supply phase reached the predetermined period, an IC dysfunction experience flag is set to ON. After finally determining, that is, fixing, at step 207 that the encoder 46 is provisionally abnormal or setting at step 209 the IC dysfunction experience flag to ON, the range switchover is continued by the open-loop control at step 210 in FIG. 5. In the open-loop control, the current supply phase is switched over at every predetermined time and the number of switchovers of the current supply phase is counted and the motor 12 is rotationally driven to the target rotation position, which corresponds to the target range, based on a switchover count value. An initial value of the switchover count value is set to the encoder count value provided immediately before starting the open-loop control. Alternatively the initial value may be set based on the output of the rotation sensor 16.

Then it is checked at step 211 whether the range switchover has been completed, that is, whether the motor 12 has rotated to the target rotation position, under the open-loop control by checking whether the switchover count value reached the target count value.

When it is determined at step 211 that the range switchover has not been completed yet (No), step 210 is repeated again. When it is determined at step 211 that the range switchover has been completed (Yes), it is checked at step 212 whether the IC dysfunction experience flag is OFF.

When it is determined at step 212 that the IC dysfunction experience flag is OFF (Yes), it is checked at step 213 whether a difference between a value of update of the switchover count value and a value of update of the encoder count value in the open-loop control is smaller than a predetermined value. This difference between the values of updates is referred to as a count value update difference. When it is determined at step 213 that the count value update difference is smaller than the predetermined value (Yes), the provisional determination that the encoder 46 is abnormal is released at step 214.

When it is determined at step 213 that the count value update difference is equal to or larger than the predetermined value (No), it is finally determined, that is, fixed, at step 215 that the encoder 46 is actually abnormal. Further, the actual abnormality of the encoder 46 is notified, for example, the encoder abnormality flag is set to ON.

When it is determined at step 215 that the IC dysfunction experience flag is ON, an abnormality confirmation operation is performed at step 216, in which the current supply phase of the motor 12 is switched over sequentially at every predetermined time. As the abnormality confirmation operation, the initial driving described above maybe performed. In performing the abnormality confirmation operation, it is checked whether the current flows in the current supply phase of the motor 12 and whether the encoder count value is updated. If the encoder 46 is abnormal at this time, the encoder count value is not updated although the current flows in the current supply phase of the motor 12.

Then it is checked at step 217 whether the encoder 46 is abnormal by checking whether the encoder count value is not updated in spite of the current flow in the current supply phase of the motor 12. When it is determined at step 217 that the encoder 46 is abnormal (Yes), the actual abnormality of the encoder 46 is finalized, that is, fixed, and the actual abnormality of the encoder 46 is notified.

When it is determined at step 217 that the encoder 46 is not abnormal (No), it is checked at step 218 whether the current flows in the current supply phase of the motor 12. When it is determined at step 218 that the current does not flow in the current supply phase of the motor 12 (No), it is finally determined that the integrated IC 40 is abnormal at step 219. At this step, the abnormality of the integrated IC 40 is notified, for example, the integrated IC abnormality flag is set to ON. When it is determined at step 218 that the current flows in the current supply phase of the motor 12 (Yes), this routine is finished without finally determining that the integrated IC 40 is abnormal.

In the second embodiment described above, when it is determined that the signal receiving function and the current supply function are both potentially abnormal, it is then checked whether the encoder 46 is abnormal by performing the abnormality confirmation operation. When it is determined as a result of the abnormality confirmation operation that the encoder 46 is abnormal, it is finally determined that the encoder 46 is abnormal. When it is determined that the encoder 46 is not abnormal and the current does not flow in the current supply phase of the motor 12, it is finally determined that the integrated IC 40 is abnormal. It is thus possible to check individually the abnormality of the encoder 46 and the abnormality of the integrated IC 40 and hence surely prevent that the encoder 46 is erroneously determined to be abnormal in spite of the abnormality of the integrated IC 40.

In the first and second embodiments described above, the potential abnormality of the signal receiving function and the potential abnormality of the current supply function of the integrated IC 40 are checked separately and the abnormality of the integrated IC 40 is finally checked based on the determination results. However, without being limited to the check operations described above, it is possible to check potential abnormality of each of two or more functions other than the signal receiving function and the power supply function of the integrated IC 40, for example, a function of turning on and off the power supply relay 51 and a function of detecting a current flowing in the motor 12 and check whether the integrated IC 40 is abnormal based on such check results.

In the first and second embodiments described above, it is possible to a part or all of the functions, which are performed by the microcomputer 41, may alternatively be performed by hardware such as one or plural integrated circuits (ICs). In the first and second embodiments described above, the motor control apparatus is applied to the system, which includes the shift range switchover mechanism configured to switch over the shift ranges among four ranges, that is, P-range, R-range, N-range and D-range. Without being limited to this application, the motor control apparatus may be applied to a system, which includes a shift range switchover mechanism configured to switch over shift ranges between two ranges, for example, P-range and Non-P-range. Further, the motor control apparatus may be applied to a system, which includes a shift range switchover mechanism configured to switch over shift ranges among three ranges, five ranges or more ranges.

The motor control apparatus is not limited to the automatic transmission, for example, AT, CVT, DCT or the like but may be applied to a system, which switches over a shift range of a transmission, for example, a reduction device, for an electric vehicle.

The motor control apparatus is not limited to the range switchover mechanism but may be applied to various systems, which include respective position switchover mechanisms using a brushless-type synchronous motor such as a switched-reluctance (SR) motor as a drive power source.

What is claimed is:
1. A motor control apparatus comprising:
a motor provided as a drive power source for a control object;
an encoder for outputting output signals in synchronization with rotation of the motor;
a control part for rotationally driving the motor by sequentially switching over a current supply phase of the motor based on a count value of the output signals of the encoder;
an integrated IC having plural functions, which include at least one of a signal receiving function for receiving the output signals of the encoder and a power supply function for supplying a current to each phase of the motor; and an abnormality diagnosis part for checking individually whether an abnormality is present potentially with respect to at least two functions among the plural functions of the integrated IC and checking whether the integrated IC is abnormal based on check results about the at least two functions, wherein the abnormality diagnosis part determines that the integrated IC is abnormal only when the check results indicate that the at least two functions are abnormal, the abnormality diagnosis part determines that the integrated IC is not abnormal when the check results indicate that only one of the at least two functions is abnormal, and the abnormality diagnosis part determines that the integrated IC is abnormal only when the check results indicate that the at least two functions, which are different from each other, are abnormal at same time.

2. The motor control apparatus according to claim 1, wherein:
the integrated IC has the signal receiving function and the power supply function; and
the abnormality diagnosis part checks whether each of the signal receiving function and the power supply function are potentially abnormal and checks whether the integrated IC is abnormal based on the check results about the signal receiving function and the power supply function.

3. The motor control apparatus according to claim 2, wherein:
the abnormality diagnosis part checks whether the signal receiving function is potentially abnormal based on whether the count value of the output signals of the encoder is updated in a period of rotationally driving the motor; and
the abnormality diagnosis part checks whether the power supply function is potentially abnormal based on whether the current flows in a current supply phase of the motor in the period of rotationally driving the motor.

4. The motor control apparatus according to claim 3, wherein:
the abnormality diagnosis part checks whether the encoder is abnormal by performing an abnormality confirmation operation, in which the current supply phase of the motor is sequentially switched over at every predetermined time, after determination that the signal receiving function and the current supply function are both potentially abnormal;
the abnormality diagnosis part finally determines that the encoder is abnormal, when the encoder is determined to be abnormal; and
the abnormality diagnosis part finally determines that the integrated IC is abnormal, when the encoder is determined to be not abnormal and the current does not flow in the current supply phase of the motor.

5. The motor control apparatus according to claim 1, wherein:
the control object is a range switchover mechanism, which switches over shift ranges.

6. A motor control apparatus comprising:
a motor provided as a drive power source for a control object;
an encoder for outputting output signals in synchronization with rotation of the motor;
a control part for rotationally driving the motor by sequentially switching over a current supply phase of the motor based on a count value of the output signals of the encoder;
an integrated IC having plural functions, which include at least one of a signal receiving function for receiving the output signals of the encoder and a power supply function for supplying a current to each phase of the motor;
an abnormality diagnosis part for checking individually whether an abnormality is present potentially with respect to at least two functions among the plural functions of the integrated IC and checking whether the integrated IC is abnormal based on check results about the at least two functions; wherein
the integrated IC has the signal receiving function and the power supply function;
the abnormality diagnosis part checks whether each of the signal receiving function and the power supply function are potentially abnormal and checks whether the integrated IC is abnormal based on the check results about the signal receiving function and the power supply function;
the abnormality diagnosis part checks whether the signal receiving function is potentially abnormal based on whether the count value of the output signals of the encoder is updated in a period of rotationally driving the motor;
the abnormality diagnosis part checks whether the current supply function is potentially abnormal based on whether the current flows in a current supply phase of the motor in the period of rotationally driving the motor;
the abnormality diagnosis part checks whether the encoder is abnormal by performing an abnormality confirmation operation, in which the current supply phase of the motor is sequentially switched over at every predetermined time, after determination that the signal receiving function and the current supply function are both potentially abnormal;
the abnormality diagnosis part finally determines that the encoder is abnormal, when the encoder is determined to be abnormal; and
the abnormality diagnosis part finally determines that the integrated IC is abnormal, when the encoder is determined to be not abnormal and the current does not flow in the current supply phase of the motor.

7. A motor control apparatus comprising:
a motor provided as a drive power source for a control object;
an encoder for outputting output signals in synchronization with rotation of the motor;
a control part for rotationally driving the motor by sequentially switching over a current supply phase of the motor based on a count value of the output signals of the encoder;
an integrated IC having plural functions, which include at least one of a signal receiving function for receiving the output signals of the encoder and a power supply function for supplying a current to each phase of the motor; and
an abnormality diagnosis part for checking individually whether an abnormality is present potentially with respect to at least two functions among the plural functions of the integrated IC and checking whether the integrated IC is abnormal based on check results about the at least two functions; wherein:

the integrated IC has the signal receiving function and the power supply function;

the abnormality diagnosis part checks whether each of the signal receiving function and the power supply function are potentially abnormal and checks whether the integrated IC is abnormal based on the check results about the signal receiving function and the power supply function;

the abnormality diagnosis part determines that the integrated IC is abnormal only when the check results for at least both of the signal receiving function and the power supply function indicate abnormality; and the abnormality diagnosis part determines that the encoder is abnormal when the signal receiving function is abnormal and the power supply function is normal.

8. A motor control apparatus comprising:

a motor provided as a drive power source for a control object;

an encoder for outputting output signals in synchronization with rotation of the motor;

a control part for rotationally driving the motor by sequentially switching over a current supply phase of the motor based on a count value of the output signals of the encoder;

an integrated IC having plural functions, which include at least one of a signal receiving function for receiving the output signals of the encoder and a power supply function for supplying a current to each phase of the motor; and an abnormality diagnosis part for checking individually whether an abnormality is present potentially with respect to at least two functions among the plural functions of the integrated IC and checking whether the integrated IC is abnormal based on check results about the at least two functions, wherein the abnormality diagnosis part determines that the integrated IC is abnormal only when the check results indicate that the at least two functions are abnormal;

the abnormality diagnosis part checks whether the encoder is abnormal by performing an abnormality confirmation operation, in which the current supply phase of the motor is sequentially switched over at every predetermined time, after determination that the signal receiving function and the current supply function are both potentially abnormal;

the abnormality diagnosis part finally determines that the encoder is abnormal, when the encoder is determined to be abnormal; and the abnormality diagnosis part finally determines that the integrated IC is abnormal, when the encoder is determined to be not abnormal and the current does not flow in the current supply phase of the motor.

* * * * *